(12) United States Patent
Zhang

(10) Patent No.: US 10,936,867 B2
(45) Date of Patent: Mar. 2, 2021

(54) SYSTEMS AND METHODS FOR BLINK ACTION RECOGNITION BASED ON FACIAL FEATURE POINTS

(71) Applicant: BEIJING DIDI INFINITY TECHNOLOGY AND DEVELOPMENT CO., LTD., Beijing (CN)

(72) Inventor: Xiubao Zhang, Beijing (CN)

(73) Assignee: BEIJING DIDI INFINITY TECHNOLOGY AND DEVELOPMENT CO.. LTD., Beijing (CN)

(*) Notice: Subject to any disclaimer, the term of this patent is extended or adjusted under 35 U.S.C. 154(b) by 0 days.

(21) Appl. No.: 16/898,428

(22) Filed: Jun. 10, 2020

(65) Prior Publication Data
US 2020/0302150 A1    Sep. 24, 2020

Related U.S. Application Data

(63) Continuation of application No. PCT/CN2018/084414, filed on Apr. 25, 2018.

(51) Int. Cl.
  *G06K 9/00* (2006.01)
  *G06T 7/62* (2017.01)
  *G06T 7/73* (2017.01)

(52) U.S. Cl.
  CPC ....... *G06K 9/0061* (2013.01); *G06K 9/00315* (2013.01); *G06T 7/62* (2017.01);
  (Continued)

(58) Field of Classification Search
  None
  See application file for complete search history.

(56) References Cited

U.S. PATENT DOCUMENTS 6,606,397 B1    8/2003    Yamamoto
7,209,574 B2    4/2007    Tafuku et al.
(Continued)

FOREIGN PATENT DOCUMENTS

CN    101030316 A    9/2007
CN    101032405 A    9/2007
(Continued)

OTHER PUBLICATIONS

International Search Report in PCT/CN2018/084414 dated Jan. 25, 2019, 4 pages.
(Continued)

*Primary Examiner* — Vikkram Bali
(74) *Attorney, Agent, or Firm* — Metis IP LLC

(57) ABSTRACT

The present disclosure relates to systems and methods for automated identification of presence of a facial action from sequential images. The systems and methods may obtain a plurality of sequential candidate image frames containing a facial object. Each of the plurality of candidate image frames may include a plurality of feature points associated with an eye of the facial object. For each of the plurality of sequential candidate image frames, the systems and methods may determine an area of a polygon based on the plurality of feature points. The systems and methods may determine a distance associated with the eye of the facial object. The systems and methods may determine an action parameter based on the area and the distance. The systems and methods may identify the presence of a blink action in response to that the action parameters satisfy one or more preset conditions.

20 Claims, 11 Drawing Sheets

(52) U.S. Cl.
CPC ...... *G06T 7/73* (2017.01); *G06T 2207/10016* (2013.01); *G06T 2207/30201* (2013.01)

(56) References Cited

U.S. PATENT DOCUMENTS

| | | | |
|---|---|---|---|
| 7,676,063 | B2 | 3/2010 | Cohen et al. |
| 7,714,927 | B2 | 5/2010 | Terashima |
| 9,690,988 | B2 * | 6/2017 | Mohanakrishnan ........................ G06K 9/00845 |
| 2005/0073136 | A1 | 4/2005 | Larsson et al. |
| 2005/0213792 | A1 | 9/2005 | Hammoud |
| 2006/0174094 | A1 | 8/2006 | Lloyd et al. |
| 2008/0226139 | A1 | 9/2008 | Suzuki et al. |
| 2008/0252745 | A1 | 10/2008 | Nakamura |
| 2008/0317385 | A1 * | 12/2008 | Nakada ................. A63F 13/213 382/305 |
| 2009/0219405 | A1 * | 9/2009 | Kaneda ................ A61B 3/0033 348/222.1 |
| 2011/0235919 | A1 | 9/2011 | Morita et al. |
| 2012/0308079 | A1 | 12/2012 | Akiyama |
| 2014/0147019 | A1 | 5/2014 | Hanita et al. |
| 2015/0098629 | A1 | 4/2015 | Perna et al. |
| 2015/0186720 | A1 | 7/2015 | Tsou et al. |
| 2016/0304099 | A1 * | 10/2016 | Hatakeyama ........ A61B 5/0496 |
| 2017/0053166 | A1 * | 2/2017 | Amayeh ............ G06K 9/00597 |
| 2017/0124394 | A1 | 5/2017 | Thavalengal |
| 2018/0089499 | A1 | 3/2018 | Sun et al. |

FOREIGN PATENT DOCUMENTS

| | | |
|---|---|---|
| CN | 105286802 A | 2/2016 |
| CN | 106897659 A | 6/2017 |
| CN | 107092873 A | 8/2017 |
| CN | 107346422 A | 11/2017 |
| CN | 107465885 A | 12/2017 |
| EP | 3139303 A1 | 3/2017 |

OTHER PUBLICATIONS

Written Opinion in PCT/CN2018/084414 dated Jan. 25, 2019, 5 pages.
Notification to Grant Patent Right for Invention in Chinese Application No. 201880043162.X dated Jul. 31, 2020, 7 pages.
Lan, Ting et al., Real time detection method of visual fatigue in video image, Computer Engineering and Applications, 48(35): 147-150, 2012.
Deng, Zhenghong et al., Fatigue Detection based on Isophote Curve, 2015 International Conference on Computer and Computational Sciences (ICCCS), 146-150, 2015.
Huang, Jiacai et al., Research on Fatigue Driving Detection based on Face Key Points, Journal of Nanjing Institute of Technology (Natural Science Edition), 15(4): 8-13, 2017.
Li Juan et al., Detection Algorithm of ati ue Driving Based on Data Fusion, Journal of Wuhan Institute of Technology, 38(5): 505-510, 2016.
Pan, Xiaodong et al., Eyes State-based Fatigue Drive Monitoring Approach, Journal of Tongji University (Natural Science), 39(2): 231-235, 2011.
First Office Action in Chinese Application No. 201880043162.X dated May 13, 2020, 9 pages.
Extended European Search Report in European Application No. 18016120.1 dated Oct. 21, 2020 7 pages.
First Examination report in Australian Application No. 2018421163 dated Oct. 30, 2020, 8 pages.

* cited by examiner

500

- Obtaining a plurality of sequential candidate image frames containing a facial object, each of the plurality of candidate image frames including one or more first feature points associated with an upper eyelid of an eye, one or more second feature points associated with a lower eyelid of the eye, a third feature point associated with a left end of the eye, and a fourth feature point associated with a right end of the eye — 510

- Determining an area of a polygon based on the one or more first feature points, the one or more second feature points, the third feature point, and the fourth feature point in each of the plurality of sequential candidate image frames — 520

- Determining a distance between the third feature point and the fourth feature point in each of the plurality of sequential candidate image frames — 530

- Determining an action parameter based on the area and the distance in each of the plurality of sequential candidate image frames — 540

- Identifying presence of a blink action in response to that the action parameters satisfy one or more preset conditions — 550

```
┌─────────────────────────────────────────────────────────────┐  710
│ Determining a reference point based at least in part on the │
│ one or more first feature points, the one or more second    │
│ feature points, the third feature point, or the fourth      │
│ feature point                                               │
└─────────────────────────────────────────────────────────────┘
                              │
                              ▼
┌─────────────────────────────────────────────────────────────┐  720
│ Determining a plurality of triangle areas based on the one  │
│ or more first feature points, the one or more second        │
│ feature points, the third feature point, the fourth feature │
│ point, and the reference point                              │
└─────────────────────────────────────────────────────────────┘
                              │
                              ▼
┌─────────────────────────────────────────────────────────────┐  730
│ Determining the area of the polygon based on the plurality  │
│ of triangle areas                                           │
└─────────────────────────────────────────────────────────────┘
```

FIG. 7-A

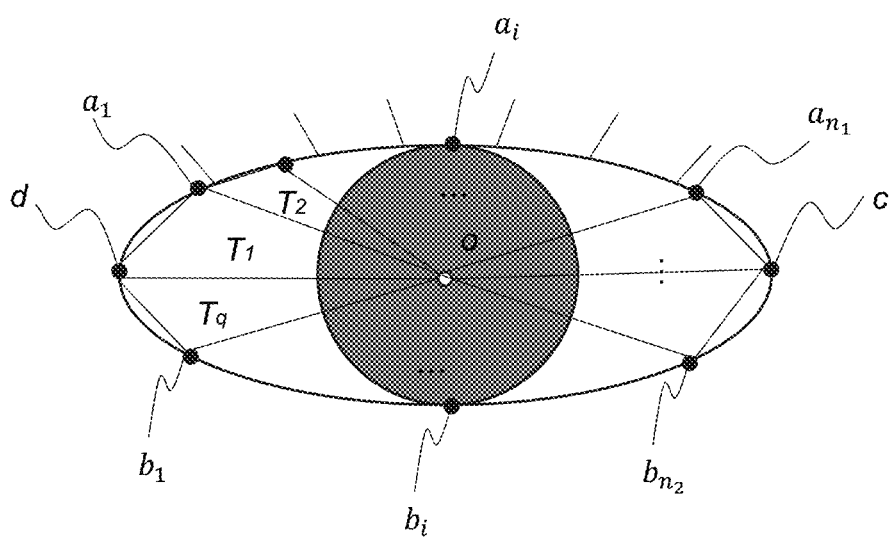

- 810 Identifying a plurality of sequential target image frames from the plurality of sequential candidate image frames, the plurality of sequential target image frames including a start image frame and an end image frame

- 820 Identifying a maximum action parameter associated with a plurality of action parameters corresponding to the plurality of sequential target image frames

- 830 Identifying a minimum action parameter from the plurality of action parameters corresponding to the plurality of sequential target image frames

- 840 Determining an asymmetry parameter based on the maximum action parameter and the minimum action parameter

- 850 Determining a first number count of target image frames from the start image frame to a target image frame corresponding to the minimum action parameter

- 860 Determining a second number count of target image frames from the target image frame corresponding to the minimum action parameter to the end image frame

- 870 Identifying the blink action in response to that the asymmetry parameter is larger than an asymmetry threshold, the first number count is larger than a first number count threshold, and the second number count is larger than a second number count threshold

For a candidate image frame, selecting a plurality of previous image frames before the candidate image frame and a plurality of next image frames after the candidate image frame along a sequence of the plurality of sequential candidate image frames — 910

Determining a first average action parameter based on a plurality of first action parameters corresponding to the plurality of previous image frames — 920

Determining a second average action parameter based on a plurality of second action parameters corresponding to the plurality of next image frames — 930

Identifying the candidate image frame as the start image frame in response to that the second average action parameter is less than the first average action parameter and each of the plurality of second action parameters is smaller than an action parameter corresponding to the candidate image frame — 940

| 1010 | For a candidate image frame after the start image frame, selecting a plurality of previous image frames before the candidate image frame and a plurality of next image frames after the candidate image frame along the sequence of the plurality of sequential candidate image frames |

↓

| 1020 | Determining a third average action parameter based on a plurality of third action parameters corresponding to the plurality of previous image frames |

↓

| 1030 | Determining a fourth average action parameter based on a plurality of fourth action parameters corresponding to the plurality of next image frames |

↓

| 1040 | Identifying the candidate image frame as the end image frame in response to that the fourth average action parameter is larger than the third average action parameter, each of the plurality of third action parameters is smaller than or equal to an action parameter corresponding to the candidate image frame, an action parameter corresponding to a next image frame adjacent to the candidate image frame is larger than or equal to the action parameter corresponding to the candidate image frame, and a ratio associated with the first average action parameter and the fourth average action parameter is less than a ratio threshold |

FIG. 10

SYSTEMS AND METHODS FOR BLINK ACTION RECOGNITION BASED ON FACIAL FEATURE POINTS

CROSS-REFERENCE TO RELATED APPLICATIONS

This application is a continuation of International Patent Application No. PCT/CN2018/084414 filed on Apr. 25, 2018, which designates the United States of America, the contents of which are hereby incorporated by reference in their entirety.

TECHNICAL FIELD

The present disclosure generally relates to systems and methods for action recognition, and in particular, to systems and methods for automated identification of the presence of a blink action from sequential image frames.

BACKGROUND

Living body detection based on human action recognition (e.g., blink action recognition) has become increasingly important in many scenarios (e.g., system login, identity authentication, Human-Computer Interaction). Take "system login" as an example, when a user intends to sign in the system via face recognition, in order to verify that the "user" is a person with a living body rather than a deceptive object (e.g., a picture), the system may need to identify an action (e.g., a blink action) of the user for the purpose of such verification. The existing technology achieves this goal by using a complex algorithm which requires excessive computing capacity, resulting in a heavy burden on the computing system. Therefore, it is desirable to provide systems and methods for automated identification of the presence of an action of a user quickly and efficiently, preferably putting less demand on computing capacity.

SUMMARY

An aspect of the present disclosure relates to a system for automated identification of presence of a facial action from sequential images. The system may include at least one storage medium including a set of instructions and at least one processor in communication with the at least one storage medium. When executing the set of instructions, the at least one processor may be directed to cause the system to perform one or more of the following operations. The at least one processor may obtain a plurality of sequential candidate image frames containing a facial object. Each of the plurality of candidate image frames may include one or more first feature points associated with an upper eyelid of an eye, one or more second feature points associated with a lower eyelid of the eye, a third feature point associated with a left end of the eye, and a fourth feature point associated with a right end of the eye. For each of the plurality of sequential candidate image frames, the at least one processor may determine an area of a polygon based on the one or more first feature points, the one or more second feature points, the third feature point, and the fourth feature point. The at least one processor may determine a distance between the third feature point and the fourth feature point in each of the plurality of sequential candidate image frames. The at least one processor may determine an action parameter based on the area and the distance in each of the plurality of sequential candidate image frames. The at least one processor may identify the presence of a blink action in response to that the action parameters satisfy one or more preset conditions.

Another aspect of the present disclosure relates to a method implemented on a computing device having at least one processor, at least one storage medium, and a communication platform connected to a network. The method may include one or more of the following operations. The at least one processor may obtain a plurality of sequential candidate image frames containing a facial object. Each of the plurality of candidate image frames may include one or more first feature points associated with an upper eyelid of an eye, one or more second feature points associated with a lower eyelid of the eye, a third feature point associated with a left end of the eye, and a fourth feature point associated with a right end of the eye. For each of the plurality of sequential candidate image frames, the at least one processor may determine an area of a polygon based on the one or more first feature points, the one or more second feature points, the third feature point, and the fourth feature point. The at least one processor may determine a distance between the third feature point and the fourth feature point in each of the plurality of sequential candidate image frames. The at least one processor may determine an action parameter based on the area and the distance in each of the plurality of sequential candidate image frames. The at least one processor may identify the presence of a blink action in response to that the action parameters satisfy one or more preset conditions.

A further aspect of the present disclosure relates to a non-transitory computer readable medium. The non-transitory computer readable medium may include executable instructions. When executed by at least one processor, the executable instructions may direct the at least one processor to perform a method. The method may include one or more of the following operations. The at least one processor may obtain a plurality of sequential candidate image frames containing a facial object. Each of the plurality of candidate image frames may include one or more first feature points associated with an upper eyelid of an eye, one or more second feature points associated with a lower eyelid of the eye, a third feature point associated with a left end of the eye, and a fourth feature point associated with a right end of the eye. For each of the plurality of sequential candidate image frames, the at least one processor may determine an area of a polygon based on the one or more first feature points, the one or more second feature points, the third feature point, and the fourth feature point. The at least one processor may determine a distance between the third feature point and the fourth feature point in each of the plurality of sequential candidate image frames. The at least one processor may determine an action parameter based on the area and the distance in each of the plurality of sequential candidate image frames. The at least one processor may identify the presence of a blink action in response to that the action parameters satisfy one or more preset conditions.

In some embodiments, the at least one processor may determine a reference point based at least in part on the one or more first feature points, the one or more second feature points, the third feature point, or the fourth feature point. The at least one processor may determine a plurality of triangle areas based on the one or more first feature points, the one or more second feature points, the third feature point, the fourth feature point, and the reference point. Each of the plurality of triangle areas may be determined based on the reference point and two adjacent points among the one or more first feature points, the one or more second feature points, the third feature point, and the fourth feature point.

The at least one processor may determine the area of the polygon based on the plurality of triangle areas.

In some embodiments, the reference point may include one of the one or more first feature points, the one or more second feature point, the third feature point, and the fourth feature point, or an orthocenter of the polygon or a central point of the polygon.

In some embodiments, the action parameter may be a ratio between the area of the polygon and the distance between the third feature point and the fourth feature point.

In some embodiments, the at least one processor may identify a plurality of sequential target image frames from the plurality of sequential candidate image frames. The plurality of sequential target image frames may include a start image frame and an end image frame. The at least one processor may identify a maximum action parameter associated with a plurality of action parameters corresponding to the plurality of sequential target image frames. The at least one processor may identify a minimum action parameter from the plurality of action parameters corresponding to the plurality of sequential target image frames. The at least one processor may determine an asymmetry parameter based on the maximum action parameter and the minimum action parameter. The at least one processor may determine a first number count of target image frames from the start image frame to a target image frame corresponding to the minimum action parameter. The at least one processor may determine a second number count of image frames from the target image frame corresponding to the minimum action parameter to the end image frame. The at least one processor may identify the blink action in response to that the asymmetry parameter is larger than an asymmetry threshold, the first number count is larger than a first number count threshold, and the second number count is larger than a second number count threshold.

In some embodiments, for a candidate image frame, the at least one processor may select a plurality of previous image frames before the candidate image frame and a plurality of subsequent image frames after the candidate image frame along a sequence of the plurality of sequential candidate image frames. The at least one processor may determine a first average action parameter based on a plurality of first action parameters corresponding to the plurality of previous image frames. The at least one processor may determine a second average action parameter based on a plurality of second action parameters corresponding to the plurality of subsequent image frames. The at least one processor may identify the candidate image frame as the start image frame in response to that the second average action parameter is less than the first average action parameter and each of the plurality of second action parameters is smaller than an action parameter corresponding to the candidate image frame.

In some embodiments, for a candidate image frame after the start image frame, the at least one processor may select a plurality of previous image frames before the candidate image frame and a plurality of subsequent image frames after the candidate image frame along the sequence of the plurality of sequential candidate image frames. The at least one processor may determine a third average action parameter based on a plurality of third action parameters corresponding to the plurality of previous image frames. The at least one processor may determine a fourth average action parameter based on a plurality of fourth action parameters corresponding to the plurality of subsequent image frames. The at least one processor may identify the candidate image frame as the end image frame in response to that the fourth average action parameter is larger than the third average action parameter, each of the plurality of third action parameters is smaller than or equal to an action parameter corresponding to the candidate image frame, an action parameter corresponding to a subsequent image frame adjacent to the candidate image frame is larger than or equal to the action parameter corresponding to the candidate image frame, and a ratio associated with the first average action parameter and the fourth average action parameter is less than a ratio threshold.

In some embodiments, the asymmetry threshold may be 1.6-2.

In some embodiments, the first number count threshold may be 4-6, or the second number count threshold may be 4-6.

In some embodiments, the at least one processor may provide an authentication to a terminal device associated with a user corresponding to the facial object in response to the identification of the presence of the eye blink action.

In some embodiments, the system may further include a camera, which may be configured to provide video data from which the plurality of sequential candidate image frames may be obtained.

In some embodiments, the at least one processor may obtain the plurality of sequential candidate image frames from video data provided by a camera.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities, and combinations set forth in the detailed examples discussed below.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart illustrating an exemplary process for identifying presence of a blink action according to some embodiments of the present disclosure;

FIG. 7-A is a flowchart illustrating an exemplary process for determining an area of a polygon based on a plurality of triangle areas according to some embodiments of the present disclosure;

FIG. 7-B is a schematic diagram illustrating exemplary triangle areas determined based on the feature points according to some embodiments of the present disclosure;

FIG. 8 is a flowchart illustrating an exemplary process for identifying presence of a blink action according to some embodiments of the present disclosure;

FIG. 9 is a flowchart illustrating an exemplary process for determining a start image frame according to some embodiments of the present disclosure;

FIG. 10 is a flowchart illustrating an exemplary process for determining an end image frame according to some embodiments of the present disclosure.

DETAILED DESCRIPTION

Figure 1:
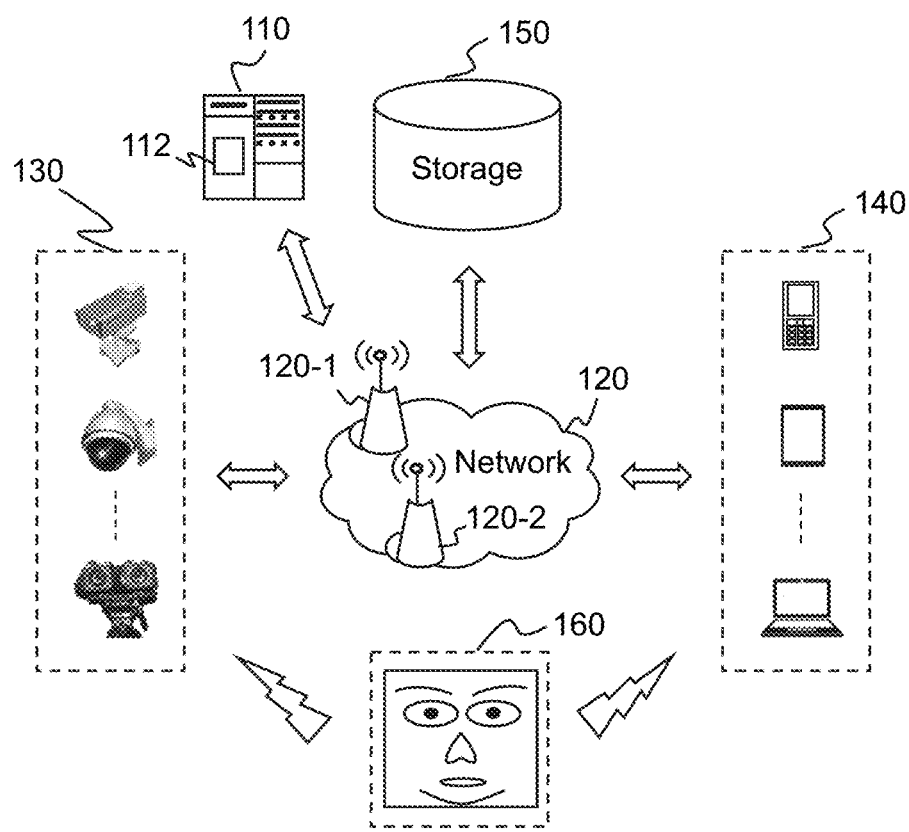
FIG. 1 is a schematic diagram illustrating an exemplary action recognition system according to some embodiments of the present disclosure.

The following description is presented to enable any person skilled in the art to make and use the present disclosure and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments of the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the systems and methods in the present disclosure is described primarily regarding a blink action identification, it should also be understood that this is only one exemplary embodiment. The systems and methods of the present disclosure may be applied to any other kind of action recognition. For example, the systems and methods of the present disclosure may be applied to other action recognitions including an eye movement, a shaking action, a nod cation, a head up action, a mouth opening action, or the like, or any combination thereof. The action recognition system may be applied in many application scenarios such as, system login, identity authentication, Human-Computer Interaction (HCI), etc. The application of the systems and methods of the present disclosure may include but not be limited to a web page, a plug-in of a browser, a client terminal, a custom system, an internal analysis system, an artificial intelligence robot, or the like, or any combination thereof.

The terms "subject," "human," or "user" in the present disclosure are used interchangeably to refer to a living body whose action is to be identified. Also, the terms "image frame," "image," "candidate image frames," and "target image frames" in the present disclosure are used to refer to frames in video data or images captured by a camera device. The terms "camera," "camera device," and "capture device" in the present disclosure may be used interchangeably to refer to a device that can capture video data or image data.

An aspect of the present disclosure relates to systems and methods for identifying the presence of a blink action. During the blink action, an area associated with an internal region within an eye of a facial object dynamically changes, accordingly, an action parameter (e.g., a ratio of the area to a distance between two end points of the eye) changes during the blink action. The systems and methods may identify the presence of the blink action based on the change of the action parameter.

For example, the systems and methods may obtain a plurality of sequential candidate image frames associated with the facial object. Each of the plurality of sequential candidate image frames may include one or more first feature points associated with an upper eyelid of an eye, one or more second feature points associated with a lower eyelid of the eye, a third feature point associated with a left end of the eye, and a fourth feature point associated with a right end of the eye. For each of the plurality of sequential candidate image frames, the systems and methods may determine an area of a polygon based on the one or more first feature points, the one or more second feature points, the third feature point, and the fourth feature point, and determine a distance between the third feature point and the fourth feature point. Further, the systems and methods may determine the action parameter (e.g., a ratio of the area of the polygon to the distance) based on the area of the polygon and the distance. Accordingly, the systems and methods may identify the presence of the blink action based on the action parameters corresponding to the plurality of sequential candidate image frames.

FIG. 1 is a schematic diagram illustrating an exemplary action recognition system according to some embodiments of the present disclosure. For example, the action recognition system 100 may be an online action recognition platform for living body recognition based on information of a facial object (e.g., a face 160 of a human).

In some embodiments, the action recognition system 100 may be used in a variety of application scenarios such as Human-Computer Interaction (HCI), system login, identity authentication, or the like, or any combination thereof. In the application scenario of HCI, the action recognition system 100 may execute instructions to perform operations defined by a user in response to an identification of an action. For example, after extracting facial information of the user and identifying an action (e.g., a blink action) of the user, the action recognition system 100 may execute instructions to perform defined operations such as turning a page of an e-book, adding animation effects during a video chat, controlling a robot to perform an operation (e.g., mopping the floor), requesting a service (e.g., a taxi hailing service), etc. In the application scenario of system login (e.g., a bank system, a payment system, an online examination system, a security and protection system, etc.), after extracting facial information of the user and identifying an action (e.g., a blink action) of the user, the action recognition system 100 may determine a login permission and allow a user account associated with the user to login the system. In the application scenario of identity authentication, after extracting facial information of the user and identifying an action (e.g., a blink action) of the user, the action recognition system 100 may determine the user's identity and provide a permission to access an account (e.g., a terminal device, a payment account, or a membership account) or a permission to enter a restricted place (e.g., a company, a library, a hospital, or an apartment).

In some embodiments, the action recognition system 100 may be an online platform including a server 110, a network 120, a camera device 130, a user terminal 140, and a storage 150.

The server 110 may be a single server or a server group. The server group may be centralized, or distributed (e.g., server 110 may be a distributed system). In some embodiments, the server 110 may be local or remote. For example, the server 110 may access information and/or data stored in the camera device 130, the user terminal 140, and/or the storage 150 via the network 120. As another example, the server 110 may be directly connected to the camera device 130, the user terminal 140, and/or the storage 150 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 200 having one or more components illustrated in FIG. 2 in the present disclosure.

In some embodiments, the server 110 may include a processing engine 112. The processing engine 112 may process information and/or data relating to action recognition to perform one or more functions described in the present disclosure. For example, the processing engine 112 may identify the presence of a blink action based on a plurality of sequential candidate image frames containing a facial object. In some embodiments, the processing engine 112 may include one or more processing engines (e.g., single-core processing engine(s) or multi-core processor(s)). Merely by way of example, the processing engine 112 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiment, the sever 110 may be unnecessary and all or part of the functions of the server 110 may be implemented by other components (e.g., the camera device 130, the user terminal 140) of the action recognition system 100. For example, the processing engine 112 may be integrated in the camera device 130 or the user terminal 140 and the functions (e.g., identifying the presence of an action of a facial object based on image frames associated with the facial object) of the processing engine 112 may be implemented by the camera device 130 or the user terminal 140.

The network 120 may facilitate the exchange of information and/or data. In some embodiments, one or more components of the action recognition system 100 (e.g., the server 110, the camera device 130, the user terminal 140, the storage 150) may exchange information and/or data with other component(s) of the action recognition system 100 via the network 120. For example, the server 110 may obtain information and/or data (e.g., image frames) from the camera device 130 via the network 120. In some embodiments, the network 120 may be any type of wired or wireless network, or a combination thereof. Merely by way of example, the network 130 may include a cable network, a wireline network, an optical fiber network, a telecommunications network, an intranet, the Internet, a local area network (LAN), a wide area network (WAN), a wireless local area network (WLAN), a metropolitan area network (MAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the action recognition system 100 may be connected to the network 120 to exchange data and/or information.

The camera device 130 may capture image data or video data containing a facial object. For example, the camera device 130 may capture a video including a plurality of image frames containing the facial object. In some embodiments, the camera device 130 may include a black-white camera, a color camera, an infrared camera, a 3-D camera, an X-ray camera, etc. In some embodiments, the camera device 130 may include a monocular camera, a binocular camera, a multi-camera, etc. In some embodiments, the camera device 130 may be a smart device including or connected to a camera. The smart device may include a smart home device (e.g., a smart lighting device, a smart television), an intelligent robot (e.g., a sweeping robot, a mopping robot, a chatting robot, an industry robot), etc. In some embodiments, the camera device 130 may be a surveillance camera. The surveillance camera may include a wireless color camera, a low light camera, a vandal proof camera, a bullet camera, a pinhole camera, a hidden spy camera, a fixed box camera, or the like, or any combination thereof. In some embodiments, the camera device 130 may be an IP camera which can transmit the captured image data or video data to any component (e.g., the server 110, the user terminal 140, the storage 150) of the action recognition system 100 via the network 120.

In some embodiments, the camera device 130 may independently identify the presence of an action of the facial object based on the captured image frames. In some embodiments, the camera device 130 may transmit the captured image frames to the server 110 or the user terminal 140 to be further processed. In some embodiments, the camera device 130 may transmit the captured image frames to the storage 150 to be stored. In some embodiments, the camera device 130 may be integrated in the user terminal 140. For example, the camera device 130 may be part of the user terminal 140, such as a camera of a mobile phone, a camera of a computer, etc.

In some embodiments, the user terminal 140 may include a mobile device, a tablet computer, a laptop computer, or the like, or any combination thereof. In some embodiments, the mobile device may include a wearable device, a smart mobile device, a virtual reality device, an augmented reality device, or the like, or any combination thereof. In some embodiments, the wearable device may include a smart bracelet, a smart footgear, smart glasses, a smart helmet, a smart watch, smart clothing, a smart backpack, a smart accessory, or the like, or any combination thereof. In some embodiments, the smart mobile device may include a mobile phone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, augmented reality glasses, an augmented reality patch, or the like, or any combination thereof. For example, the virtual reality device and/or the augmented reality device may include a Google Glass™, a RiftCon™, a Fragments™, a Gear VR™, etc.

In some embodiments, the user terminal 140 may exchange information and/or data with other components of the action recognition system 100 (e.g., the server 110, the camera device 130, the user terminal 140, the storage 150) directly or via the network 120. For example, the user terminal 140 may obtain image frames from the camera device 130 or the storage 150 to identify the presence of an action of a facial object based on the image frames. As another example, the user terminal 140 may receive a message (e.g., an authentication) from the server 110.

The storage 150 may store data and/or instructions. In some embodiments, the storage 150 may store data obtained from the camera device 130 and/or the user terminal 140. In some embodiments, the storage 150 may store data and/or instructions that the server 110 may execute or use to perform exemplary methods described in the present disclosure. In some embodiments, storage 150 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc. In some embodiments, the storage 150 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the storage 150 may be connected to the network 120 to communicate with one or more components of the action recognition system 100 (e.g., the server 110, the camera device 130, the user terminal 140, etc.). One or more components of the action recognition system 100 may access the data or instructions stored in the storage 150 via the network 120. In some embodiments, the storage 150 may be directly connected to or communicate with one or more components of the action recognition system 100 (e.g., the server 110, the camera device 130, the user terminal 140, etc.). In some embodiments, the storage 150 may be part of the server 110.

In some embodiments, one or more components (e.g., the server 110, the camera device 130, the user terminal 140) of the action recognition system 100 may have permission to access the storage 150. For example, the user terminal 140 may access information/data (e.g., image frames containing the facial object) from the storage 150.

This description is intended to be illustrative, and not to limit the scope of the present disclosure. Many alternatives, modifications, and variations will be apparent to those skilled in the art. The features, structures, methods, and other characteristics of the exemplary embodiments described herein may be combined in various ways to obtain additional and/or alternative exemplary embodiments. For example, the storage 150 may be a data storage including cloud computing platforms, such as, public cloud, private cloud, community, and hybrid clouds, etc. However, those variations and modifications do not depart the scope of the present disclosure.

Figure 2:
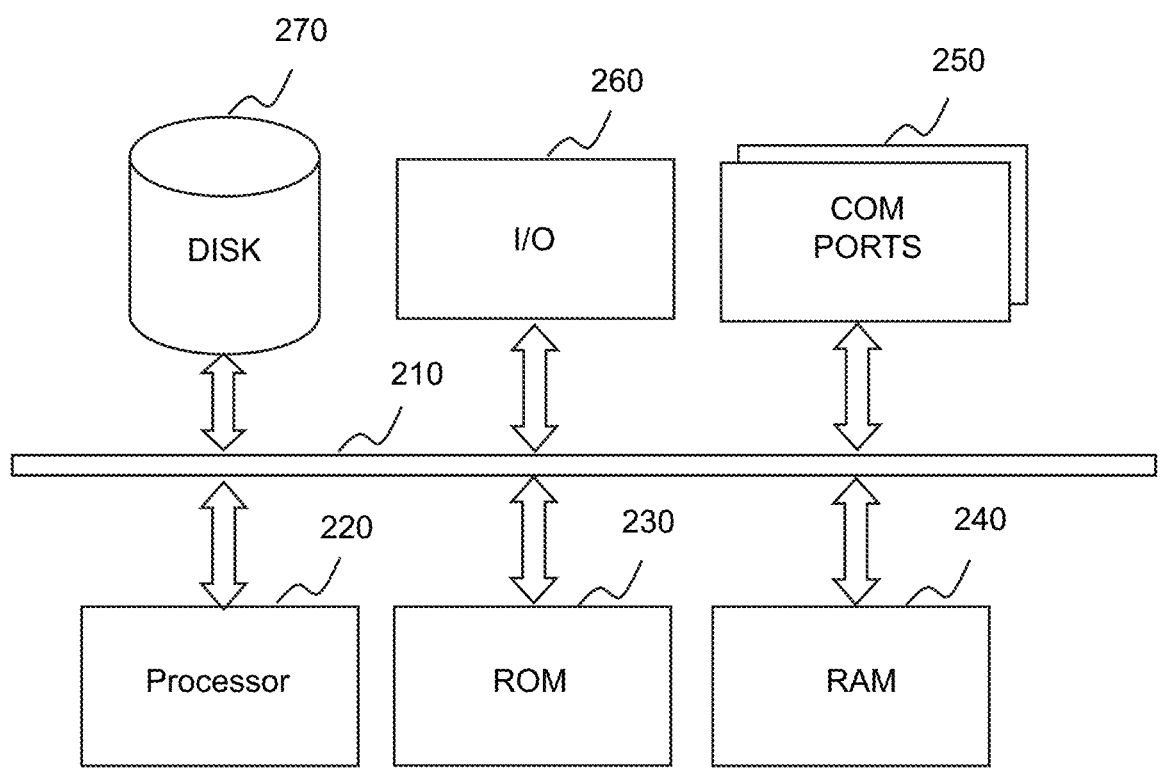
FIG. 2 is a schematic diagram illustrating exemplary hardware and/or software components of a computing device according to some embodiments of the present disclosure.

FIG. 2 is a schematic diagram illustrating exemplary hardware and/or software components of a computing device 200 according to some embodiments of the present disclosure. In some embodiments, the server 110, the camera device 130, and/or the user terminal 140 may be implemented on the computing device 200. For example, the processing engine 112 may be implemented on the computing device 200 and configured to perform functions of the processing engine 112 disclosed in this disclosure.

The computing device 200 may be used to implement any component of the action recognition system 100 as described herein. For example, the processing engine 112 may be implemented on the computing device 200, via its hardware, software program, firmware, or a combination thereof. Although only one such computer is shown, for convenience, the computer functions relating to the action recognition as described herein may be implemented in a distributed fashion on a number of similar platforms to distribute the processing load.

The computing device 200, for example, may include COM ports 250 connected to and from a network connected thereto to facilitate data communications. The computing device 200 may also include a processor 220, in the form of one or more processors (e.g., logic circuits), for executing program instructions. For example, the processor 220 may include interface circuits and processing circuits therein. The interface circuits may be configured to receive electronic signals from a bus 210, wherein the electronic signals encode structured data and/or instructions for the processing circuits to process. The processing circuits may conduct logic calculations, and then determine a conclusion, a result, and/or an instruction encoded as electronic signals. Then the interface circuits may send out the electronic signals from the processing circuits via the bus 210.

The computing device 200 may further include program storage and data storage of different forms including, for example, a disk 270, and a read only memory (ROM) 230, or a random access memory (RAM) 240, for various data files to be processed and/or transmitted by the computing device. The exemplary computer platform may also include program instructions stored in the ROM 230, RAM 240, and/or other type of non-transitory storage medium to be executed by the processor 220. The methods and/or processes of the present disclosure may be implemented as the program instructions. The computing device 200 also includes an I/O component 260, supporting input/output between the computer and other components. The computing device 200 may also receive programming and data via network communications.

Merely for illustration, only one processor is described in FIG. 2. Multiple processors are also contemplated, thus operations and/or method steps performed by one processor as described in the present disclosure may also be jointly or separately performed by the multiple processors. For example, if in the present disclosure the processor of the computing device 200 executes both step A and step B, it should be understood that step A and step B may also be performed by two different CPUs and/or processors jointly or separately in the computing device 200 (e.g., the first processor executes step A and the second processor executes step B, or the first and second processors jointly execute steps A and B).

Figure 3:
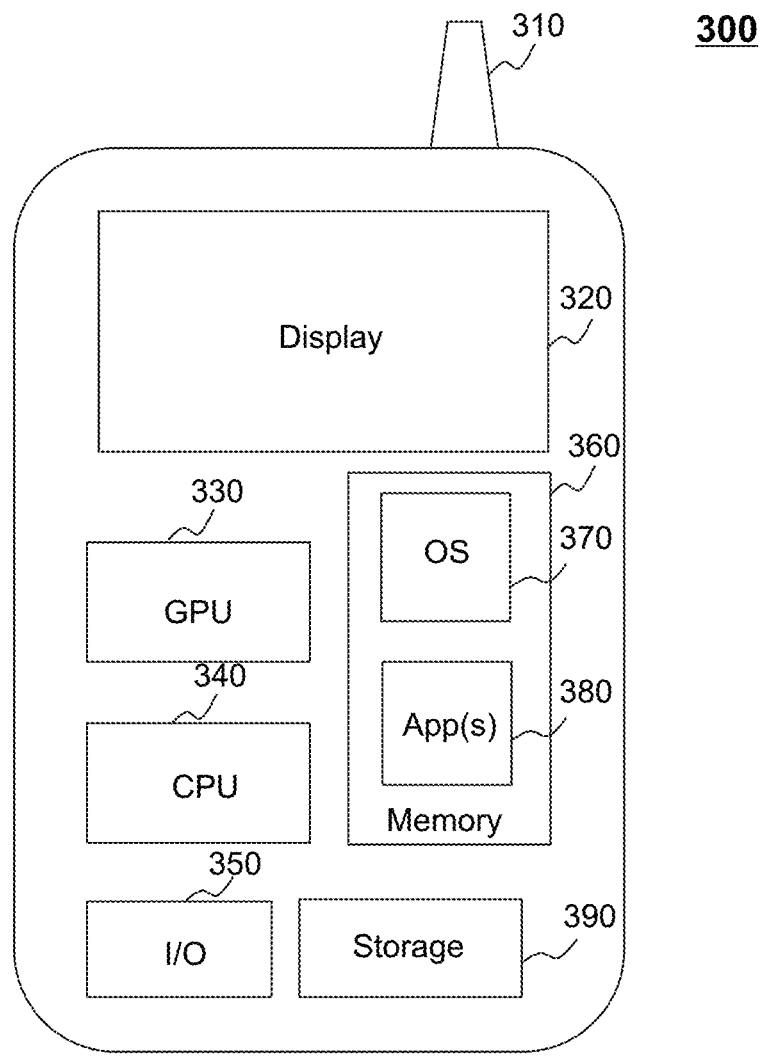
FIG. 3 is a schematic diagram illustrating exemplary hardware and/or software components of a mobile device according to some embodiments of the present disclosure.

FIG. 3 is a schematic diagram illustrating exemplary hardware and/or software components of a mobile device 300 on which the camera device 130, the user terminal 140, or part of the camera device 130 or the user terminal 140 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, a mobile operating system (OS) 370, and a storage 390. In some embodiments, any other suitable component, including but not limited to a system bus or a controller (not shown), may also be included in the mobile device 300.

In some embodiments, the mobile operating system 370 (e.g., iOS™, Android™, Windows Phone™, etc.) and one or more applications 380 may be loaded into the memory 360 from the storage 390 in order to be executed by the CPU 340. The applications 380 may include a browser or any other suitable mobile apps for receiving and rendering information relating to action recognition or other information from the action recognition system 100. User interactions with the information stream may be achieved via the I/O 350 and provided to the processing engine 112 and/or other components of the action recognition system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a system if appropriately programmed.

Figure 4:
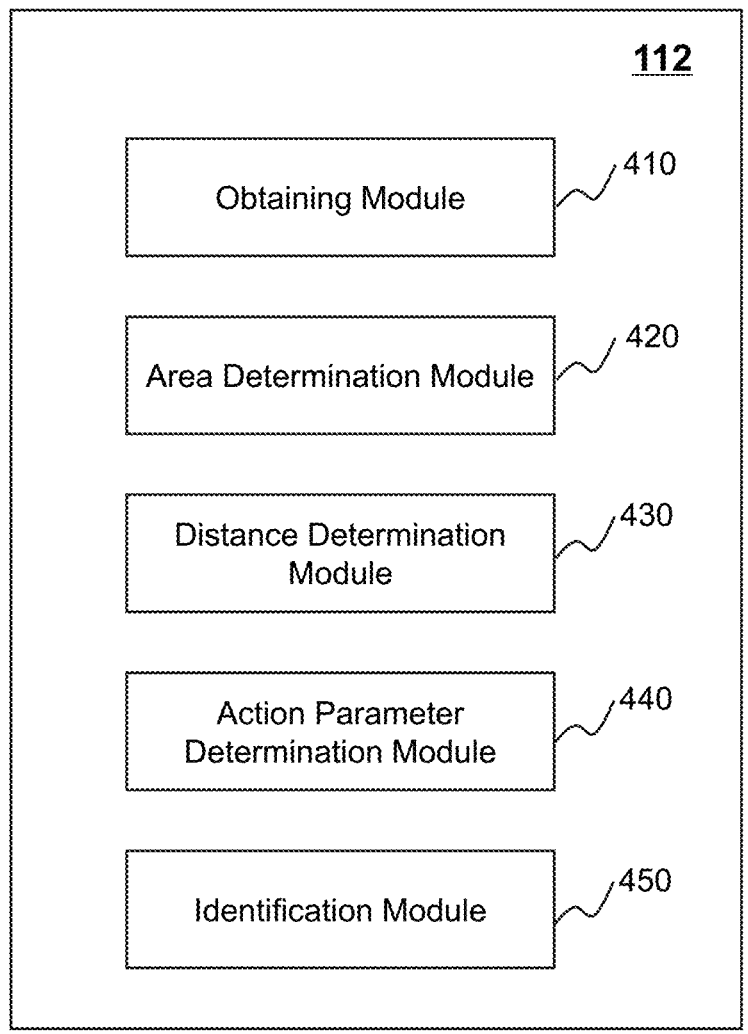
FIG. 4 is a block diagram illustrating an exemplary processing engine according to some embodiments of the present disclosure.

FIG. 4 is a block diagram illustrating an exemplary processing engine according to some embodiments of the present disclosure. The processing engine 112 may include an obtaining module 410, an area determination module 420, a distance determination module 430, an action parameter determination module 440, and an identification module 450.

The obtaining module 410 may be configured to obtain a plurality of sequential candidate image frames containing a facial object. The facial object may refer to a face of a subject (e.g., a human, an animal). The obtaining module 410 may obtain the plurality of sequential candidate image frames from the camera device 130, the user terminal 140, or a storage device (e.g., the storage 150) disclosed elsewhere in the present disclosure.

As used herein, an "image frame" may refer to a frame in a video, and "sequential" may refer to that the image frames are aligned according to a sequence (e.g., a temporal sequence) in the video. For example, the camera device 130 may capture a video in chronological order. The video includes a plurality of image frames corresponding to a plurality of capture time points respectively. Accordingly, the image frames are aligned in chronological order based on the capture time points.

Figure 6:
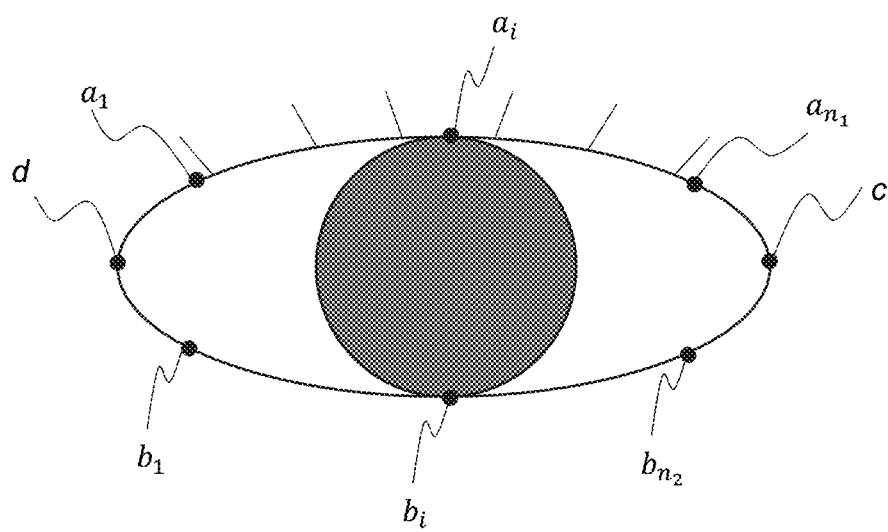
FIG. 6 is a schematic diagram illustrating exemplary feature points according to some embodiments of the present disclosure.

In some embodiments, each of the plurality of candidate image frames may include a plurality of feature points associated with the facial object. In some embodiments, as illustrated in FIG. 6-A, the plurality of feature points may include one or more first feature points (e.g., point $a_1$, ..., point $a_i$, ..., and point $a_{n_1}$) associated with an upper eyelid of an eye, one or more second feature points (e.g., point $b_1$, ..., point $b_i$, ..., and point $b_{n_2}$) associated with a lower eyelid of the eye, a third feature point (e.g., point c) associated with a left end of the eye, and a fourth feature point (e.g., point d) associated with a right end of the eye.

The area determination module 420 may be configured to determine an area of a polygon based on the one or more first feature points, the one or more second feature points, the third feature point, and the fourth feature point in each of the plurality of sequential candidate image frames. The area of the polygon indicates an area of an internal region within the eye of the facial object.

The distance determination module 430 may be configured to determine a distance between the third feature point and the fourth feature point in each of the plurality of sequential candidate image frames. The distance here indicates a length of the eye.

The action parameter determination module 440 may be configured to determine an action parameter based on the area of the polygon and the distance in each of the plurality of sequential candidate image frames. In some embodiments, the action parameter may be a ratio of the area of the polygon to the distance.

The identification module 450 may be configured to identify the presence of a blink action in response to that the action parameters satisfy one or more preset conditions. It is known that during the blink action, the upper eyelid of the eye of the facial object may move along a downward direction from a start position to a middle position and then move along an upward direction from the middle position to an end position. Therefore, during the blink action, the area of the internal region within the eye (which may be expressed by the area of the polygon) dynamically changes. Accordingly, the action parameter dynamically changes during the blink action.

The modules in the processing engine 112 may be connected to or communicated with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. Two or more of the modules may be combined into a single module, and any one of the modules may be divided into two or more units. For example, the area determination module 420 and the distance determination module 430 may be combined as a single module which may both determine the area of the polygon and the distance between the two end points of the eye. As another example, the processing engine 112 may include a storage module (not shown) which may be used to store data generated by the above-mentioned modules.

FIG. 5 is a flowchart illustrating an exemplary process for identifying the presence of a blink action according to some embodiments of the present disclosure. In some embodiments, the process 500 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 500. The operations of the illustrated process presented below are intended to be illustrative. In some embodiments, the process 500 may be accomplished with one or more additional operations not described and/or without one or more of the operations herein discussed. Additionally, the order in which the operations of the process as illustrated in FIG. 5 and described below is not intended to be limiting.

In 510, the processing engine 112 (e.g., the obtaining module 410) (e.g., the interface circuits of the processor 220) may obtain a plurality of sequential candidate image frames containing a facial object. The facial object may refer to a face of a subject (e.g., a human, an animal). The processing engine 112 may obtain the plurality of sequential candidate image frames from the camera device 130, the user terminal 140, or a storage device (e.g., the storage 150) disclosed elsewhere in the present disclosure.

As used herein, an "image frame" may refer to a frame in a video, and "sequential" may refer to that the image frames are aligned according to a sequence (e.g., a temporal sequence) in the video. For example, the camera device 130 may capture a video in chronological order. The video includes a plurality of image frames corresponding to a plurality of capture time points respectively. Accordingly, the image frames are aligned in chronological order based on the capture time points.

In some embodiments, the plurality of sequential candidate image frames may be expressed as an ordered set illustrated bellow:

$$F=[F_1, F_2, F_i, \ldots, F_m], \quad (1)$$

where F refers to the ordered set, $F_i$ refers to an ith candidate image frame, and m refers to a number count of the plurality of candidate image frames. In the ordered set, the plurality of sequential candidate image frames are ordered in chronological order based on capture time points of the plurality of candidate image frames. For example, the candidate image frame $F_1$ corresponds to a first capture time point and the candidate image frame $F_2$ corresponds to a second capture time point, wherein the second capture time point is later than the first capture time point and a time interval between the first capture time point and the second capture time point may be a default parameter of the camera device 130 or may be set by the action recognition system 100. For example, the camera device 130 may capture 24 image frames per second; in certain embodiments, the intervals between neighboring candidate image frames may be 1/24 second, meaning that all the captured image frames are used as candidate image frames; in certain other embodiments, the intervals between neighboring candidate image frames may be 1/12 second, meaning that certain (half) captured image frames are used as candidate image frames but the others are skipped.

In some embodiments, each of the plurality of candidate image frames may include a plurality of feature points associated with the facial object. As used herein, a "feature point" may refer to a point located on the face; in certain embodiments, the feature point is a point on the face and is measurably recognizable, for example, a point on an end of an eye, a point on a brow, a point on a nose, etc. In some embodiments, the processing engine 112 may determine the plurality of feature points based on a facial recognition process. The facial recognition process may include a process based on geometric features, a local face analysis process, a principle component analysis process, a deep-learning-based process, or the like, or any combination thereof.

In some embodiments, as illustrated in FIG. 6-A, the plurality of feature points may include one or more first feature points (e.g., point $a_1, \ldots,$ point $a_i, \ldots$ and point $a_{n_1}$) associated with an upper eyelid of an eye, one or more second feature points (e.g., point $b_1, \ldots,$ point $b_i, \ldots,$ and point $b_{n_2}$) associated with a lower eyelid of the eye, a third feature point (e.g., point c) associated with a left end of the eye, and a fourth feature point (e.g., point d) associated with a right end of the eye.

In 520, for each of the plurality of sequential candidate image frames, the processing engine 112 (e.g., the area determination module 420) (e.g., the processing circuits of the processor 220) may determine an area of a polygon based on the one or more first feature points, the one or more second feature points, the third feature point, and the fourth feature point. The area of the polygon indicates an area of an internal region within the eye of the facial object. In some embodiments, the processing engine 112 may determine the area of the polygon based on a plurality of triangle areas (e.g., triangle areas $T_1, T_2, \ldots, T_q$ illustrated in FIG. 7-B). More descriptions of the determination of the area of the polygon may be found elsewhere in the present disclosure (e.g., FIG. 7-A and the description thereof).

In 530, the processing engine 112 (e.g., the distance determination module 430) (e.g., the processing circuits of the processor 220) may determine a distance between the third feature point and the fourth feature point in each of the plurality of sequential candidate image frames. The distance here indicates a length of the eye. For a specific facial object, the distance may be a constant value in the image frames.

In some embodiments, the processing engine 112 may determine the distance according to formula (2) below:

$$D=\sqrt{(x_3-x_4)^2+(y_3-y_4)^2} \quad (2)$$

where D refers to the distance between the third feature point and the fourth feature point, $(x_3, y_3)$ refers to a coordinate of the third feature point, and $(x_4, y_4)$ refers to a coordinate of the fourth feature point. For illustration purposes, the present disclosure takes a rectangular coordinate system as an example, it should be noted that the coordinates of the feature points may be expressed in any coordinate system (e.g., a polar coordinate system) and an origin of the coordinate system may be any point in the image frame.

In 540, the processing engine 112 (e.g., the action parameter determination module 440) (e.g., the processing circuits of the processor 220) may determine an action parameter based on the area of the polygon and the distance in each of the plurality of sequential candidate image frames. In some embodiments, the action parameter may be a ratio of the area of the polygon to the distance, as illustrated in formula (3) below:

$$A = \frac{S}{D} \quad (3)$$

where A refers to the action parameter, S refers to the area of the polygon, and D refers to the distance between the third feature point and the fourth feature point.

In 550, the processing engine 112 (e.g., the identification module 450) (e.g., the processing circuits of the processor 220) may identify the presence of a blink action in response to that the action parameters satisfy one or more preset conditions. It is known that during the blink action, the upper eyelid of the eye of the facial object may move along a downward direction from a start position to a middle position and then move along an upward direction from the middle position to an end position. Therefore, during the blink action, the area of the internal region within the eye (which may be expressed by the area of the polygon) dynamically changes. Accordingly, the action parameter dynamically changes during the blink action.

Assuming that the start position and the end position both correspond to a time point when the facial object is facing right to or substantially right to the camera device 130 with the eye completely open, in ideal conditions, the action parameter corresponding to the start position and the action parameter corresponding to the end position are a fixed value and approximately equal to each other. During the blink action, the middle position may be a stop position where the upper eyelid of the eye stops moving down (or starts moving up back), which corresponds to a time point when the eye is completely closed, and the action parameter is minimum at the time point (in ideal conditions, the action parameter corresponding to the middle position is 0). Accordingly, the processing engine 112 may identify a plurality of sequential target image frames including a start image frame which corresponds to or substantially corresponds to the start position, an end image frame which corresponds to or substantially corresponds to the end position, and a middle image frame which corresponds to or substantially corresponds to the middle position, and identify the presence of the blink action based on the action parameters of the start image frame, the end image frame, and the middle image frame. More descriptions of the identification of the blink action may be found elsewhere in the present disclosure (e.g., FIGS. 8-10 and the descriptions thereof).

It should be noted that "substantially corresponds to" used herein refers to that a time interval between a capture time point when the image frame is captured and a time point corresponding to the position is less than a time threshold that is recognizable for an ordinary person in the art. It is known that the camera device 130 captures image frames according to a frame rate (which may be a default parameter), that is, capture time points of two adjacent image frames are not continuous (i.e., there is a time interval between the two capture time points). Therefore, take the "start position" as an example, in some situations the start image frame may not strictly correspond to a time point of the start position, but the capture time point of the start image frame may be a time point which is very close to the time point of the start position. In ideal conditions, we can consider that the two time points are the same because the intervals between the candidate image frames are usually short. In addition, for an ordinary person in the art, the blink action is a significantly fast action, therefore, it is difficult to capture an image frame which strictly corresponds to the middle position. In the present disclosure, an ordinary person in the art should understand that the "middle image frame" refers to an image frame with a capture time point that is closest to the time point of the middle position.

In some embodiments, the processing engine 112 may further provide an authentication to a terminal device (e.g., the user terminal 140) associated with a user corresponding to the facial object in response to the identification of the presence of the blink action. After receiving the authentication, the user can have an access permission to the terminal device.

It should be noted that the above description is merely provided for the purposes of illustration, and not intended to limit the scope of the present disclosure. For persons having ordinary skills in the art, multiple variations or modifications may be made under the teachings of the present disclosure. However, those variations and modifications do not depart from the scope of the present disclosure. For example, operation 530 may be optional. The processing engine 112 may obtain a reference distance (e.g., a statistical value associated with a distance between two end points of an eye) from a storage device (e.g., the storage 150) disclosed elsewhere in the present disclosure or an external data source. As another example, one or more other optional operations (e.g., a storing operation) may be added elsewhere in the process 500. In the storing operation, the processing engine 112 may store information (e.g., the plurality of sequential candidate image frames, the area of the polygon, the distance, the action parameter) associated with the action identification in a storage device (e.g., the storage 150) disclosed elsewhere in the present disclosure.

FIG. 6 is a schematic diagram illustrating exemplary feature points according to some embodiments of the present disclosure. As described in connection with 510, each of the plurality of candidate image frames may include one or more first feature points associated with the upper eyelid of the eye, one or more second feature points associated with the lower eyelid of the eye, a third feature point associated with the left end of the eye, and a fourth feature point associated with the right end of the eye.

As illustrated, the one or more first feature points may include point $a_1$, ... point $a_i$, ..., and point $a_{n_1}$ on the upper eyelid, the one or more second feature points may include point $b_1$, ..., point $b_j$, ..., and point $b_{n_2}$ on the lower eyelid, the third feature point may be a point c on the left end of the eye, and the fourth feature point may be a point d on the right end of the eye. The value of $n_1$ and the value of $n_2$ may be the same as or different from each other.

FIG. 7-A is a flowchart illustrating an exemplary process for determining an area of a polygon based on a plurality of triangle areas according to some embodiments of the present disclosure. In some embodiments, the process 700 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 700. The operations of the illustrated process presented below are intended to be illustrative. In some embodiments, the process 700 may be accomplished with one or more additional operations not described and/or without one or more of the operations herein discussed. Additionally, the order in which the operations of the process as illustrated in FIG. 7 and described below is not intended to be limiting. In some embodiments, operation 520 may be performed based on the process 700.

In 710, the processing engine 112 (e.g., the area determination module 420) (e.g., the processing circuits of the processor 220) may determine a reference point based at least in part on the one or more first feature points, the one or more second feature points, the third feature point, or the fourth feature point. In some embodiments, the reference point may be any point on any edge of the polygon. For example, the reference point may be one of the one or more first feature points, the one or more second feature points, the third feature point, or the fourth feature point. In some embodiments, the reference point may be any point within the polygon. For example, the reference point may be an orthocenter of the polygon, a central point of the polygon, etc.

Take the orthocenter of the polygon as an example, the processing engine 112 may determine the reference point according to formula (4) below:

$$(x_g, y_g) = \left( \frac{x_{a_1} + \ldots x_{a_i} + \ldots x_{a_{n_1}} + x_{b_1} + \ldots x_{b_i} + \ldots x_{b_{n_2}} + x_3 + x_4}{n_1 + n_2 + 2}, \right.$$
$$\left. \frac{y_{a_1} + \ldots y_{a_i} + \ldots y_{a_{n_1}} + y_{b_1} + \ldots y_{b_i} + \ldots y_{b_{n_2}} + y_3 + y_4}{n_1 + n_2 + 2} \right) \quad (4)$$

where $(x_g, y_g)$ refers to a coordinate of the reference point, $(x_{a_i}, y_{a_i})$ refers to a coordinate of an ith first feature point, and $(x_{b_i}, y_{b_i})$ refers to a coordinate of an ith second feature point.

In 720, the processing engine 112 (e.g., the area determination module 420) (e.g., the processing circuits of the processor 220) may determine a plurality of triangle areas based on the one or more first feature points, the one or more second feature points, the third feature point, the fourth feature point, and the reference point, wherein each of the plurality of triangle areas is determined based on the reference point and two adjacent points among the one or more first feature points, the one or more second feature points, the third feature point, and the fourth feature point.

As illustrated in FIG. 7-B, take a first triangle area as an example, the processing engine 112 may determine the first triangle area based on point o (i.e., the reference point), point $a_1$ (i.e., a first "first feature point"), and point d (i.e., the fourth feature point) according to formula (5) below:

$$T_1 = (x_{a_1} * y_4 + x_4 * y_g + x_g * y_{a_1} - x_{a_1} * y_g - x_4 * y_{a_1} - x_g * y_4)/2 \quad (5)$$

where $T_1$ refers to the first triangle area, $(x_{a_1}, y_{a_1})$ refers to a coordinate of the first "first feature point", $(x_4, y_4)$ refers to a coordinate of the fourth feature point, and $(x_g, y_g)$ refers to a coordinate of the reference point.

In 730, the processing engine 112 (e.g., the area determination module 420) (e.g., the processing circuits of the processor 220) may determine the area of the polygon based on the plurality of triangle areas. For example, the processing engine 112 may determine the area of the polygon according to formula (6) below:

$$S = T_1 + T_2 + \ldots T_i + \ldots + T_q \quad (6)$$

where S refers to the area of the polygon, $T_i$ refers to an ith triangle area, and q refers to a number count of the plurality of triangle areas.

It should be noted that the exemplary embodiment above for determining the area of the polygon is provided for illustration purposes, and not intended to limit the scope of the present disclosure. An ordinary person in the art should understand that any method for determining an area of a polygon may be applied in the present disclosure. For example, the processing engine 112 may estimate a circle or an ellipse by fitting the one or more first feature points, the one or more second feature points, the third feature point, and the fourth feature point, and determine an area of the circle or the ellipse as the area of the polygon. As another example, the processing engine 112 may divide the polygon into a plurality of quadrangles and determine a sum of areas of the plurality of quadrangles as the area of the polygon.

FIG. 7-B is a schematic diagram illustrating exemplary triangle areas determined based on the feature points according to some embodiments of the present disclosure. As illustrated, point o refers to the reference point, the processing engine 112 may determine the plurality of triangle areas (e.g., $T_1$, $T_2$, . . . and $T_q$) based on point o and any two adjacent feature points (e.g., point $a_1$ and point d, point d and point $b_1$, point $a_{n_1}$ and point c, etc.).

It should be noted that the above description is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure.

FIG. 8 is a flowchart illustrating an exemplary process for identifying the presence of a blink action according to some embodiments of the present disclosure. In some embodiments, the process 800 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 800. The operations of the illustrated process presented below are intended to be illustrative. In some embodiments, the process 800 may be accomplished with one or more additional operations not described and/or without one or more of the operations herein discussed. Additionally, the order in which the operations of the process as illustrated in FIG. 8 and described below is not intended to be limiting. In some embodiments, operation 550 may be performed based on process 800.

In 810, the processing engine 112 (e.g., the identification module 450) (e.g., the processing circuits of the processor 220) may identify a plurality of sequential target image frames from the plurality of sequential candidate image frames. As described in connection with 550, the plurality of sequential target image frames include a start image frame which corresponds to or substantially corresponds to the start position (i.e., a position where the upper eyelid of the eye of the facial object starts moving along the downward direction), an end image frame which corresponds to or substantially corresponds to the end position (i.e., a position where the upper eyelid of the eye of the facial object stops moving along the upward direction), and a middle image frame which corresponds to or substantially corresponds to the middle position (i.e., a position where the upper eyelid of the eye of the facial object stops moving down (or starts moving up back)).

In 820, the processing engine 112 (e.g., the identification module 450) (e.g., the processing circuits of the processor 220) may identify a maximum action parameter associated with a plurality of action parameters corresponding to the plurality of sequential target image frames. As described above, the maximum action parameter corresponds to the start image frame or the end image frame.

In some embodiments, the processing engine 112 may determine the maximum action parameter based on an action parameter (also referred to as "start action parameter") corresponding to the start image frame and an action parameter (also referred to as "end action parameter") corresponding to the end image frame. For example, the processing engine 112 may determine an average action parameter of the start action parameter and the end action parameter as the maximum action parameter.

Figure 11:
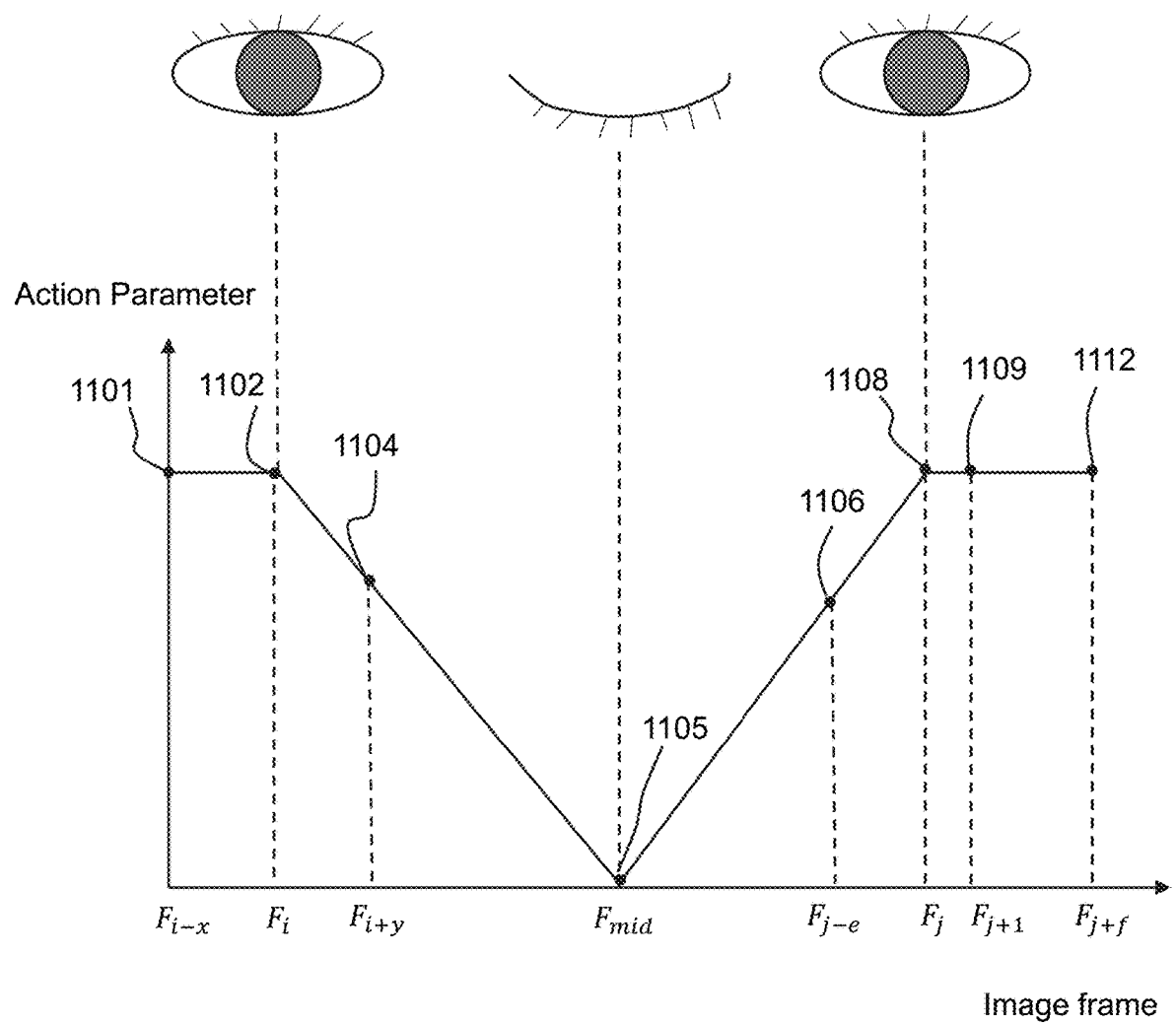
FIG. 11 is a schematic diagram illustrating an exemplary curve indicating a variation process of an action parameter during a blink action according to some embodiments of the present disclosure.

In some embodiments, as illustrated in FIG. 11, within a time period before a capture time point corresponding to the start image frame, the facial object may keep facing right to or substantially right to the camera device 130 with the eye completely open, during which the action parameter stays almost unchanged (e.g., from point 1101 to point 1102), and within a time period after the capture time point corresponding to the end image frame, the facial object may keep facing right to or substantially right to the camera device 130 with the eye completely open, within which the action parameter also stays almost unchanged (e.g., from point 1108 to point 1112), therefore, the processing engine 112 may determine two average action parameters (i.e., a first average action parameter and a fourth average action parameter described in FIG. 9 and FIG. 10 respectively) corresponding to the two time periods respectively, and further determine an average value of the two average action parameters as the maximum action parameter.

In 830, the processing engine 112 (e.g., the identification module 450) (e.g., the processing circuits of the processor 220) may identify a minimum action parameter from the plurality of action parameters corresponding to the plurality of sequential target image frames. As described above, the minimum action parameter corresponds to the middle image frame.

In 840, the processing engine 112 (e.g., the identification module 450) (e.g., the processing circuits of the processor 220) may determine an asymmetry parameter based on the maximum action parameter and the minimum action parameter. The asymmetry parameter may indicate an amplitude of action parameters corresponding to the plurality of sequential target image frames. In some embodiments, the processing engine 112 may determine the asymmetry parameter according to formula (7) below:

$$Asy = \frac{A_{max}}{A_{min}} \quad (7)$$

where Asy refers to the asymmetry parameter, $A_{max}$ refers to the maximum action parameter, and $A_{min}$ refers to the minimum action parameter.

In 850, the processing engine 112 (e.g., the identification module 450) (e.g., the processing circuits of the processor 220) may determine a first number count of target image frames from the start image frame to a target image frame (i.e., the middle image frame) corresponding to the minimum action parameter.

In 860, the processing engine 112 (e.g., the identification module 450) (e.g., the processing circuits of the processor 220) may determine a second number count of target image frames from the target image frame (i.e., the middle image frame) corresponding to the minimum action parameter to the end image frame.

In 870, the processing engine 112 (e.g., the identification module 450) (e.g., the processing circuits of the processor 220) may identify the presence of a blink action based on the asymmetry parameter, the first number count, and the second number count. The processing engine 112 may identify the presence of the blink action in response to that the asymmetry parameter is larger than an asymmetry threshold, the first number count is larger than a first number count threshold, and the second number count is larger than a second number count threshold.

In some embodiments, the asymmetry threshold may be default settings of the action recognition system 100, or may be adjustable under different situations. For example, the asymmetry threshold may be any value within a range from 1.2 to 3.

In some embodiments, the first number count threshold and the second number count threshold may be default settings of the action recognition system 100. For example, the first number count threshold or the second number count threshold may be any value (e.g., 4) within a range from 2 to 10. In some embodiments, the first number count threshold and the second number count threshold may be adjustable according to a frame rate of the camera device 130 or the interval between neighboring image frames. The frame rate may refer to a number of image frames captured by the camera device 130 per unit time (e.g., per second). In some embodiments, a larger frame rate of the camera device 130 may correspond to a larger first number count threshold or a larger second number count threshold. In some embodiments, the first number count threshold and the second number count threshold may be the same or different.

It should be noted that the above description is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure.

FIG. 9 is a flowchart illustrating an exemplary process for determining a start image frame according to some embodiments of the present disclosure. In some embodiments, the process 900 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 900. The operations of the illustrated process presented below are intended to be illustrative. In some embodiments, the process 900 may be accomplished with one or more additional operations not described and/or without one or more of the operations herein discussed. Additionally, the order in which the operations of the process as illustrated in FIG. 9 and described below is not intended to be limiting. In some embodiments, operation 810 may be performed based on process 900.

In 910, for a candidate image frame, the processing engine 112 (e.g., the identification module 450) (e.g., the processing circuits of the processor 220) may select a plurality of previous image frames before the candidate image frame and a plurality of subsequent image frames after the candidate image frame along a sequence of the plurality of sequential candidate image frames. As described in connection with 510, the plurality of sequential candidate image frames are ordered in chronological order based on the capture time points. Accordingly, the "sequence" here refers to the chronological order. Further, "previous image frames" here refer to continuous image frames immediately before the candidate image frame along the sequence, and "subsequent image frames" refer to continuous image frames immediately after the candidate image frame.

Take an ith candidate image frame $F_i$ as an example, the plurality of previous image frames before the ith candidate image frame may be expressed as an ordered set below:

$$P_1 = [F_{i-x}, \ldots, F_{i-2}, F_{i-1}] (i > 1, x < i) \quad (8)$$

where $P_1$ refers to the ordered set including the plurality of previous image frames and x refers to a number count of the plurality of previous image frames.

Also take the ith candidate image frame $F_i$ as an example, the plurality of subsequent image frames after the ith candidate image frame may be expressed as an ordered set below:

$$N_1 = [F_{i+1}, F_{i+2}, \ldots, F_{i+y}] (i \geq 1, y \leq m-1) \quad (9)$$

where $N_1$ refers to the ordered set including the plurality of subsequent image frames, y refers to a number count of the plurality of subsequent image frames, and m refers to a number count of the plurality of candidate image frames.

In 920, the processing engine 112 (e.g., the identification module 450) (e.g., the processing circuits of the processor 220) may determine a first average action parameter based on a plurality of first action parameters corresponding to the plurality of previous image frames. For example, the processing engine 112 may determine the first average action parameter according to formula (10) below:

$$A_1^p = (A_{i-x} + \ldots + A_{i-2} + A_{i-1})/x \quad (10)$$

where $A_1^p$ refers to the first average action parameter, and $A_{i-x}$ refers to a first action parameter corresponding to a (i-x)th candidate image frame.

In 930, the processing engine 112 (e.g., the identification module 450) (e.g., the processing circuits of the processor 220) may determine a second average action parameter based on a plurality of second action parameters corresponding to the plurality of subsequent image frames. For example, the processing engine 112 may determine the second average action according to formula (11) below:

$$A_2^n = (A_{i+1} + A_{i+2} + \ldots + A_{i+y})/y \quad (11)$$

where $A_2^n$ refers to the second average action parameter, and $A_{i+y}$ refers to a second action parameter corresponding to a (i+y)th candidate image frame.

In 940, the processing engine 112 (e.g., the identification module 450) (e.g., the processing circuits of the processor 220) may identify the candidate image frame as the start image frame in response to that the second average action parameter is less than the first average action parameter and each of the plurality of second action parameters is smaller than the action parameter corresponding to the candidate image frame.

As described in connection with 550, the start image frame (e.g., point 1102 illustrated in FIG. 11) corresponds to or substantially corresponds to the start position where the facial object is facing right to or substantially right to the camera device 130 with the eye completely open. Within a time period before a capture time point corresponding to the start image frame, the facial object may keep facing right to or substantially right to the camera device 130 with the eye completely open, during which the action parameter stays almost unchanged (e.g., from point 1101 to point 1102 illustrated in FIG. 11). Sequentially, the upper eyelid of the eye of the facial object moves from the start position along the downward direction during which the action parameter gradually decreases (e.g., from point 1102 to point 1104 illustrated in FIG. 11). Therefore, for the start image frame, the second average action parameter of the plurality of subsequent image frames is less than the first average action parameter of the plurality of previous image frames and each of the plurality of second action parameters corresponding to the subsequent image frames is less than the action parameter of the start image frame.

It should be noted that the above description is provided for the purpose of illustration, and is not intended to limit the scope of the present disclosure. For persons having ordinary skills in the art, multiple variations and modifications may be made under the teaching of the present disclosure. However, those variations and modifications do not depart from the scope of the present disclosure.

FIG. 10 is a flowchart illustrating an exemplary process for determining an end image frame according to some embodiments of the present disclosure. In some embodiments, the process 1000 may be implemented as a set of instructions (e.g., an application) stored in the storage ROM 230 or RAM 240. The processor 220 and/or the modules in FIG. 4 may execute the set of instructions, and when executing the instructions, the processor 220 and/or the modules may be configured to perform the process 1000. The operations of the illustrated process presented below are intended to be illustrative. In some embodiments, the process 1000 may be accomplished with one or more additional operations not described and/or without one or more of the operations herein discussed. Additionally, the order in which the operations of the process as illustrated in FIG. 10 and described below is not intended to be limiting. In some embodiments, operation 810 may be performed based on process 1000.

In 1010, for a candidate image frame after the start image frame, the processing engine 112 (e.g., the identification module 450) (e.g., the processing circuits of the processor 220) may select a plurality of previous image frames before the candidate image frame and a plurality of subsequent image frames after the candidate image frame along the sequence of the plurality of sequential candidate image frames. As described in connection with 910, the "previous image frames" refer to continuous image frames immediately before the candidate image frame along the sequence, and the "subsequent image frames" refer to continuous image frames immediately after the candidate image frame.

Take a jth candidate image frame $F_j$ after the start image frame (assuming that the start image frame is $F_i$) as an example, the plurality of previous image frames before the jth candidate image frame may be expressed as an ordered set below:

$$P_2 = [F_{j-e}, \ldots, F_{j-2}, F_{j-1}] ((j-e) \geq i) \quad (12)$$

where $P_2$ refers to the ordered set including the plurality of previous image frames and e refers to a number count of the plurality of previous image frames.

Also take the jth candidate image frame $F_j$ as an example, the plurality of subsequent image frames after the jth candidate image frame may be expressed as an ordered set below:

$$N_2 = [F_{j+1}, F_{j+2}, \ldots, F_{j+f}] ((j+f) \leq m) \quad (13)$$

where $N_2$ refers to the ordered set including the plurality of subsequent image frames and f refers to a number count of the plurality of subsequent image frames.

In 1020, the processing engine 112 (e.g., the identification module 450) (e.g., the processing circuits of the processor 220) may determine a third average action parameter based on a plurality of third action parameters corresponding to the plurality of previous image frames. For example, the processing engine 112 may determine the third average action parameter according to formula (14) below:

$$A_3^p = (A_{j-e} + \ldots + A_{j-2} + A_{j-1})/e \quad (14)$$

where $A_3^p$ refers to the third average action parameter, and $A_{j-e}$ refers to a third action parameter corresponding to a (j-e)th candidate image frame.

In 1030, the processing engine 112 (e.g., the identification module 450) (e.g., the processing circuits of the processor 220) may determine a fourth average action parameter based on a plurality of fourth action parameters corresponding to the plurality of subsequent image frames. For example, the processing engine 112 may determine the fourth average action parameter according to formula (15) below:

$$A_4{}''=(A_{j+1}+A_{j+2}+\ldots+A_{j+f})/f \quad (15)$$

where $A_4{}''$ refers to the fourth average action parameter, and $A_{j+f}$ refers to a fourth action parameter corresponding to a (j+f)th candidate image frame.

In 1040, the processing engine 112 (e.g., the identification module 450) (e.g., the processing circuits of the processor 220) may identify the candidate image frame as the end image frame in response to that the fourth average action parameter is larger than the third average action parameter, each of the plurality of third action parameters is smaller than or equal to the action parameter corresponding to the candidate image frame, an action parameter corresponding to a subsequent image frame adjacent to the candidate image frame is larger than or equal to the action parameter corresponding to the candidate image frame, and a ratio associated with the first average action parameter and the fourth average action parameter is less than a ratio threshold.

As used herein, the ratio associated with the first average action parameter and the fourth average action parameter may be expressed as formula (16) below:

$$R = \max\left(\frac{A_1^p}{A_4^n}, \frac{A_4^n}{A_1^p}\right) \quad (16)$$

where R refers to the ratio associated with the first average action parameter and the fourth average action parameter, $A_1^p$ refers to the first average action parameter, and $A_4{}''$ refers to the fourth average action parameter.

In some embodiments, the ratio threshold may be default settings of the action recognition system 100, or may be adjustable under different situations. For example, the ratio threshold may be any value within a range from 1.05 to 1.2.

As described in connection with 550, the end image frame (e.g., point 1108 illustrated in FIG. 11) corresponds to or substantially corresponds to the end position where the upper eyelid of the eye of the facial object moves back and the facial object is facing right to or substantially right to the camera device 130 with the eye completely open. Within a time period before a capture time point corresponding to the end image frame, the upper eyelid of the eye is moving along the upward direction during which the action parameter gradually increases (e.g., from point 1106 to point 1108 illustrated in FIG. 11); within a time period after the capture time point corresponding to the end image frame, the facial object may keep facing right to or substantially right to the camera device 130 with the eye completely open, within the action parameter staying almost unchanged (e.g., from point 1108 to point 1112 as illustrated in FIG. 11). Therefore, for the end image frame, the fourth average action parameter of the plurality of subsequent image frames is larger than the third average action parameter of the plurality of previous image frames, each of the plurality of third action parameters is smaller than or equal to the action parameter corresponding to the end image frame, an action parameter corresponding to a subsequent image frame (e.g., point 1109 illustrated in FIG. 11) adjacent to the end image frame is larger than or equal to the action parameter corresponding to the end image frame.

FIG. 11 is a schematic diagram illustrating an exemplary curve indicating a variation process of the action parameter according to some embodiments of the present disclosure. As illustrated in FIG. 11, the horizontal axis refers to "image frame" and the vertical axis refers to "action parameter."

As described elsewhere in the present disclosure, the processing engine 112 may identify a plurality of sequential target image frames associated with the facial object and identify the presence of a blink action based on the plurality of sequential target image frames. In some embodiments, the plurality of sequential target image frames include a start image frame $F_i$, an end image frame $F_j$, and a middle image frame $F_{mid}$ having the minimum action parameter. As illustrated in FIG. 11, point 1102 corresponds to the start image frame, point 1108 corresponds to the end image frame, and point 1105 corresponds to the middle image frame.

During a blink action, as described elsewhere in the present disclosure, the upper eyelid of the eye of the facial object moves from a start position to a middle position along a downward direction and moves from the middle position to an end position along an upward direction. The start image frame may correspond to or substantially correspond to the start position corresponding to a time point when the facial object is facing right to or substantially right to the camera device 130 with the eye completely open. As used herein, "substantially right to" refers to that an angle between a direction that the facial object is facing to and a direction pointing perpendicularly at the camera device 130 is less than a threshold that is recognizable for an ordinary person in the art. In some embodiments, the action parameter of the start image frame is a fixed value which may be default settings of the action recognition system 100, or may be adjustable under different situations.

As the upper eyelid of the eye moves from the start position along the downward direction, in the image frames, the area of the polygon associated with the internal region of the eye gradually decreases and accordingly the action parameter associated with a ratio of the area of the polygon to a distance between two end points of the eye gradually decreases, for example, as illustrated in a section of the curve from point 1102 to point 1105.

Further, the upper eyelid of the eye moves to the middle position (e.g., point 1105) where the upper eyelid of the eye stops moving down (or starts moving up back), which corresponds to a time point when the eye is completely closed, and the action parameter is minimum at the time point.

As the upper eyelid of the eye moves from the middle position along the upward direction, the area of the polygon associated with the internal region of the eye gradually increases in the image frames. Accordingly, the action parameter associated with the ratio of the area of the polygon to the distance between the two end points of the eye gradually increases, for example, as illustrated in a section of the curve from point 1105 to point 1108.

Finally, the upper eyelid of the eye moves to the end position which is the same as or substantially same as the start position. As used herein, "substantially same as" refers to that an angle between a direction that the facial object is facing to at the end position and a direction that the facial object is facing to at the start position is less than an angle threshold that is recognizable for an ordinary person in the art.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

What is claimed is:

1. A system for automated identification of presence of a facial action from sequential images, comprising:
at least one storage medium including a set of instructions; and
at least one processor in communication with the at least one storage medium, wherein when executing the set of instructions, the at least one processor is directed to cause the system to:
obtain a plurality of sequential candidate image frames containing a facial object, each of the plurality of candidate image frames including one or more first feature points associated with an upper eyelid of an eye, one or more second feature points associated with a lower eyelid of the eye, a third feature point associated with a left end of the eye, and a fourth feature point associated with a right end of the eye;
for each of the plurality of sequential candidate image frames, determine an area of a polygon based on the one or more first feature points, the one or more second feature points, the third feature point, and the fourth feature point;
determine a distance between the third feature point and the fourth feature point in each of the plurality of sequential candidate image frames;
determine an action parameter based on the area and the distance in each of the plurality of sequential candidate image frames; and
identify the presence of a blink action in response to that the action parameters satisfy one or more preset conditions.

2. The system of claim 1, wherein to determine the area of the polygon, the at least one processor is directed to cause the system further to:
- determine a reference point based at least in part on the one or more first feature points, the one or more second feature points, the third feature point, or the fourth feature point;
- determine a plurality of triangle areas based on the one or more first feature points, the one or more second feature points, the third feature point, the fourth feature point, and the reference point, wherein each of the plurality of triangle areas is determined based on the reference point and two adjacent points among the one or more first feature points, the one or more second feature points, the third feature point, and the fourth feature point; and
- determine the area of the polygon based on the plurality of triangle areas.

3. The system of claim 2, wherein the reference point is:
(a) one of the one or more first feature points, the one or more second feature point, the third feature point, and the fourth feature point, or
(b) an orthocenter of the polygon or a central point of the polygon.

4. The system of claim 1, wherein the action parameter is a ratio between the area of the polygon and the distance between the third feature point and the fourth feature point.

5. The system of claim 1, wherein to identify the presence of the blink action in response to that the action parameters satisfy the one or more preset conditions, the at least one processor is directed to cause the system further to:
- identify a plurality of sequential target image frames from the plurality of sequential candidate image frames, the plurality of sequential target image frames including a start image frame and an end image frame;
- identify a maximum action parameter associated with a plurality of action parameters corresponding to the plurality of sequential target image frames;
- identify a minimum action parameter from the plurality of action parameters corresponding to the plurality of sequential target image frames;
- determine an asymmetry parameter based on the maximum action parameter and the minimum action parameter;
- determine a first number count of target image frames from the start image frame to a target image frame corresponding to the minimum action parameter;
- determine a second number count of image frames from the target image frame corresponding to the minimum action parameter to the end image frame; and
- identify the blink action in response to that the asymmetry parameter is larger than an asymmetry threshold, the first number count is larger than a first number count threshold, and the second number count is larger than a second number count threshold.

6. The system of claim 5, wherein to identify the start image frame of the plurality of sequential target image frames, the at least one processor is directed to cause the system to:
- for a candidate image frame, select a plurality of previous image frames before the candidate image frame and a plurality of subsequent image frames after the candidate image frame along a sequence of the plurality of sequential candidate image frames;
- determine a first average action parameter based on a plurality of first action parameters corresponding to the plurality of previous image frames;
- determine a second average action parameter based on a plurality of second action parameters corresponding to the plurality of subsequent image frames; and
- identify the candidate image frame as the start image frame in response to that the second average action parameter is less than the first average action parameter and each of the plurality of second action parameters is smaller than an action parameter corresponding to the candidate image frame.

7. The system of claim 5, wherein to identify the end image frame of the plurality of sequential target image frames, the at least one processor is directed to cause the system further to:
- for a candidate image frame after the start image frame, select a plurality of previous image frames before the candidate image frame and a plurality of subsequent image frames after the candidate image frame along the sequence of the plurality of sequential candidate image frames;
- determine a third average action parameter based on a plurality of third action parameters corresponding to the plurality of previous image frames;
- determine a fourth average action parameter based on a plurality of fourth action parameters corresponding to the plurality of subsequent image frames; and
- identify the candidate image frame as the end image frame in response to that the fourth average action parameter is larger than the third average action parameter, each of the plurality of third action parameters is smaller than or equal to an action parameter corresponding to the candidate image frame, an action parameter corresponding to a subsequent image frame adjacent to the candidate image frame is larger than or equal to the action parameter corresponding to the candidate image frame, and a ratio associated with the first average action parameter and the fourth average action parameter is less than a ratio threshold.

8. The system of claim 5, wherein the asymmetry threshold is 1.6-2.

9. The system of claim 5, wherein the first number count threshold is 4-6, or the second number count threshold is 4-6.

10. The system of claim 1, wherein the at least one processor is directed to cause the system further to:
- provide an authentication to a terminal device associated with a user corresponding to the facial object in response to the identification of the presence of the eye blink action.

11. The system of claim 1, further comprising a camera, which is configured to provide video data from which the plurality of sequential candidate image frames are obtained.

12. A method implemented on a computing device having at least one processor, at least one storage medium, and a communication platform connected to a network, the method comprising:
- obtaining a plurality of sequential candidate image frames containing a facial object, each of the plurality of candidate image frames including one or more first feature points associated with an upper eyelid of an eye, one or more second feature points associated with a lower eyelid of the eye, a third feature point associated with a left end of the eye, and a fourth feature point associated with a right end of the eye;
- for each of the plurality of sequential candidate image frames, determining an area of a polygon based on the one or more first feature points, the one or more second feature points, the third feature point, and the fourth feature point;

determining a distance between the third feature point and the fourth feature point in each of the plurality of sequential candidate image frames;

determining an action parameter based on the area and the distance in each of the plurality of sequential candidate image frames, and identifying the presence of a blink action in response to that the action parameters satisfy one or more preset conditions.

13. The method of claim 12, wherein the determining the area of the polygon includes:

determining a reference point based at least in part on the one or more first feature points, the one or more second feature points, the third feature point, or the fourth feature point, determining a plurality of triangle areas based on the one or more first feature points, the one or more second feature points, the third feature point, the fourth feature point, and the reference point, wherein each of the plurality of triangle areas is determined based on the reference point and two adjacent points among the one or more first feature points, the one or more second feature points, the third feature point, and the fourth feature point, and determining the area of the polygon based on the plurality of triangle areas.

14. The method of claim 13, wherein the reference point is:

(a) one of the one or more first feature points, the one or more second feature point, the third feature point, and the fourth feature point, or (b) an orthocenter of the polygon or a central point of the polygon.

15. The method of claim 12, wherein the action parameter is a ratio between the area of the polygon and the distance between the third feature point and the fourth feature point.

16. The method of claim 12, wherein the identifying the presence of the blink action in response to that the action parameters satisfy the one or more preset conditions includes:

identifying a plurality of sequential target image frames from the plurality of sequential candidate image frames, the plurality of sequential target image frames including a start image frame and an end image frame;

identifying a maximum action parameter associated with a plurality of action parameters corresponding to the plurality of sequential target image frames;

identifying a minimum action parameter from the plurality of action parameters corresponding to the plurality of sequential target image frames;

determining an asymmetry parameter based on the maximum action parameter and the minimum action parameter;

determining a first number count of target image frames from the start image frame to a target image frame corresponding to the minimum action parameter;

determining a second number count of image frames from the target image frame corresponding to the minimum action parameter to the end image frame; and identifying the blink action in response to that the asymmetry parameter is larger than an asymmetry threshold, the first number count is larger than a first number count threshold, and the second number count is larger than a second number count threshold.

17. The method of claim 16, wherein the identifying the start image frame of the plurality of sequential target image frames includes:

for a candidate image frame, selecting a plurality of previous image frames before the candidate image frame and a plurality of subsequent image frames after the candidate image frame along a sequence of the plurality of sequential candidate image frames;

determining a first average action parameter based on a plurality of first action parameters corresponding to the plurality of previous image frames;

determining a second average action parameter based on a plurality of second action parameters corresponding to the plurality of subsequent image frames; and identifying the candidate image frame as the start image frame in response to that the second average action parameter is less than the first average action parameter and each of the plurality of second action parameters is smaller than an action parameter corresponding to the candidate image frame.

18. The method of claim 16, wherein the identifying the end image frame of the plurality of sequential target image frames includes:

for a candidate image frame after the start image frame, selecting a plurality of previous image frames before the candidate image frame and a plurality of subsequent image frames after the candidate image frame along the sequence of the plurality of sequential candidate image frames;

determining a third average action parameter based on a plurality of third action parameters corresponding to the plurality of previous image frames;

determining a fourth average action parameter based on a plurality of fourth action parameters corresponding to the plurality of subsequent image frames; and identifying the candidate image frame as the end image frame in response to that the fourth average action parameter is larger than the third average action parameter, each of the plurality of third action parameters is smaller than or equal to an action parameter corresponding to the candidate image frame, an action parameter corresponding to a subsequent image frame adjacent to the candidate image frame is larger than or equal to the action parameter corresponding to the candidate image frame, and a ratio associated with the first average action parameter and the fourth average action parameter is less than a ratio threshold.

19. The method of claim 12, wherein the method further includes:

providing an authentication to a terminal device associated with a user corresponding to the facial object in response to the identification of the presence of the blink action.

20. A non-transitory computer readable medium, comprising executable instructions that, when executed by at least one processor, directs the at least one processor to perform a method, the method comprising:

obtaining a plurality of sequential candidate image frames containing a facial object, each of the plurality of candidate image frames including one or more first feature points associated with an upper eyelid of an eye, one or more second feature points associated with a lower eyelid of the eye, a third feature point associated with a left end of the eye, and a fourth feature point associated with a right end of the eye;

for each of the plurality of sequential candidate image frames, determining an area of a polygon based on the one or more first feature points, the one or more second feature points, the third feature point, and the fourth feature point;
determining a distance between the third feature point and the fourth feature point in each of the plurality of sequential candidate image frames;
determining an action parameter based on the area and the distance in each of the plurality of sequential candidate image frames, and
identifying the presence of a blink action in response to that the action parameters satisfy one or more preset conditions.

* * * * *